(12) United States Patent
Perets et al.

(10) Patent No.: US 6,535,900 B1
(45) Date of Patent: Mar. 18, 2003

(54) ACCUMULATION SATURATION BY MEANS OF FEEDBACK

(75) Inventors: Ronen Perets, Herzlia (IL); Yael Gross, Ramat Gan (IL); Moshe Sheier, Tel-Aviv (IL)

(73) Assignee: DSP Group Ltd., Herzlia (IL)

( * ) Notice: Subject to any disclaimer, the term of this patent is extended or adjusted under 35 U.S.C. 154(b) by 0 days.

(21) Appl. No.: 09/391,823

(22) Filed: Sep. 8, 1999

Related U.S. Application Data

(60) Provisional application No. 60/099,432, filed on Sep. 8, 1998.

(51) Int. Cl.[7] ................................................. G06F 7/38
(52) U.S. Cl. ....................................... 708/552; 708/498
(58) Field of Search ................................. 708/552, 498

(56) References Cited

U.S. PATENT DOCUMENTS

| | | | | |
|---|---|---|---|---|
| 4,223,389 A | * | 9/1980 | Amada et al. | 708/552 |
| 5,508,951 A | * | 4/1996 | Ishikawa | 708/552 |
| 5,847,978 A | * | 12/1998 | Ogura et al. | 708/552 |
| 5,936,870 A | * | 8/1999 | Im | 708/552 |
| 5,974,540 A | * | 10/1999 | Morikawa et al. | 708/552 |
| 6,321,248 B1 | * | 11/2001 | Bonnet et al. | 708/552 |

* cited by examiner

*Primary Examiner*—David H. Malzahn
(74) *Attorney, Agent, or Firm*—Eitan, Pearl, Latzer & Cohen-Zedek

(57) ABSTRACT

A processor made up of a computation unit, an accumulator unit, a saturation determination unit and a saturation unit. The computation unit operates on one or more operands of W bits. The accumulator unit stores the output of the computation unit, in W bits. The saturation determination unit detects overflow in parallel with latching of the output of the computation unit. Overflow occurs when the operand latched by the accumulator represents a number having more than A significant bits, where A is less than W. The saturation unit provides saturation operands to the computation unit when the operand latched in the accumulator unit represents a number having more than A significant bits. Furthermore, the processor has saturation operands of either $(+2^{A-1}-1)$ or $-2^{A-1}$. A method for using the processor is also disclosed.

12 Claims, 4 Drawing Sheets

ACCUMULATION SATURATION BY MEANS OF FEEDBACK

CROSS REFERENCES TO RELATED APPLICATIONS

This application is related to U.S. Provisional Patent Application Ser. No. 60/099,432 filed on Sep. 8, 1998, incorporated in its entirety by reference herein.

FIELD OF THE INVENTION

The present invention relates to accumulation saturation and more particularly to accumulation saturation in conjunction with a digital signal processor (DSP).

BACKGROUND OF THE INVENTION

Reference is now made to FIG. 1A which illustrates some of the main components of a digital signal processor 10 according to the prior art. DSP 10 is made up of a computation unit (CU) 12 connected to an accumulator 14. Accumulator 14 is a storage element and is utilized for storing the result of an arithmetical or logical operation of CU 12. The data stored within the accumulator 14 may, for example, be used as input data to CU 12 via a feedback loop or may be written to memory, as indicated.

The number of bits of information supported by CU 12 is a measure of the accuracy of DSP 10, as it defines the dynamic range of the values that can be represented by DSP 10. For example, 16 bits can represent a range of 0 to $2^{16}-1$ or alternatively a range of $2^{15}-1$ to $-2^{15}$ with one bit being utilized for the sign. The situation is similar with 32 bits. 32 bits can therefore represent a range of 0 to $2^{32}-1$ or $2^{31}-1$ to $-2^{31}$. FIG. 1A illustrates CU 12 supporting an accuracy of 40 bits and accumulator 14 supporting an accuracy of 40 bits. It is usual for the accumulator 14 in a given DSP 10 to be chosen to be wider than the data width supported by DSP 10 for memory access. This allows the computations to be performed accurately whilst only the most significant portion of the result is used as the final result and written back to memory or to another device.

Different DSP 10 architectures exist; with different accumulator widths and standard algorithms which are strictly defined with a set of input and output vectors. This has led to a situation where a standard developed using a 32 bit accumulator DSP 10, for example, yields different results or fails to meet the standard requirements when run on a DSP with a 40 bit accumulator which appears to have a larger accuracy. The DSP performance is thus degraded in terms of its accuracy in order for it to meet the requirements of a specific standard FIG. 1A illustrates a 40 bit accumulator 14 attached to a 40 bit CU 12. In general, the accumulator width is W bits and the accuracy required (in order to meet the standard) is A bits. (where W is greater than A). The extra bits over and above those required are denoted E, where E=W−A. In the present example, DSP 10 has a 40 bit accumulator 14 (i.e W=40) and a 40 bit CU, but a limitation of accuracy is required to, for example, 32 bits (A=32) in order to meet the standard. This occurs when the standard only supports an accuracy of computation between CU 12 and accumulator 14 of 32 bits.

Reference is now made to FIG. 1B which illustrates a DSP 10 containing an exemplary mechanism for limiting the accuracy of computation between CU 12 and accumulator 14 according to the prior art. Similar items to those of previous figures have similar reference numbers and will not be described further. The method consists of inserting a saturation unit 16 between CU 12 and accumulator 14 in order to limit the accuracy of the computation to that required to correspond with the standard. Saturation unit 16 performs the operation of saturation (box 17) when overflow (box 18) is detected which means that the value leaving CU 12 is made up of more than 32 bits of information. Saturation is defined as the operation of clipping a value that cannot be represented in the exemplary required accuracy of 32 bits (i.e A=32) to the maximum or minimum value that can be represented in 32 bits. In other words, saturation is applied in case of 32 bit overflow. The value is thus limited to a value represented by 32 bits only, in the present example.

The computation is slower and less efficient due to the fact that the saturation check and substitution occurs on the path from the output of CU 12 to accumulator 14. The check to detect overflow and the substitution of a saturated value between CU 12 and accumulator 14 delay the computation and therefore reduce the speed and hence the performance of the processor.

SUMMARY OF THE INVENTION

An object of the present invention is to provide saturation of values in a digital signal processor (DSP) with minimal degradation of processor performance.

A further object of the present invention is to provide means for saturating values in the feedback loop of a DSP between an accumulator and a computation unit and thus improving the speed of the processor.

There is thus provided, in accordance with a preferred embodiment of the present invention, a processor made up of a computation unit, an accumulator unit, a saturation determination unit and a saturation unit. The computation unit operates on one or more operands of W bits. The accumulator unit stores the output of the computation unit, in W bits. The saturation determination unit detects overflow in parallel with latching of the output of the computation unit. Overflow occurs when the operand latched by the accumulator represents a number having more than A significant bits, where A is less than W. The saturation unit provides saturation operands to the computation unit when the operand latched in the accumulator unit represents a number having more than A significant bits. Furthermore, the processor has saturation operands of either $(+2^{A-1}-1)$ or $-2^{A-1}$.

There is further provided a method for providing saturated operands to a computation unit made up of the steps of latching an operand of W bits, detecting in parallel with the step of latching a condition and providing the computation unit with a saturated operand if the condition is met. The operand is initially received and latched by an accumulator from a computation unit. The condition detected is that the operand latched in the accumulator represents a number having more than A significant bits, where A is less than W. The saturation operand provided to the computation unit is the maximum positive or negative value which can be represented in A bits. Furthermore, the saturation operand provided to the computation unit is either $(+2^{A-1}-1)$ or $-2^{A-1}$.

Further, there is provided a method for providing saturated operands in a feedback to a computation unit which entails providing a computation unit with a saturation operand. The computation unit is provided with a saturation operand if an operand stored in an accumulator represents a number with greater than A significant bits.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1A:
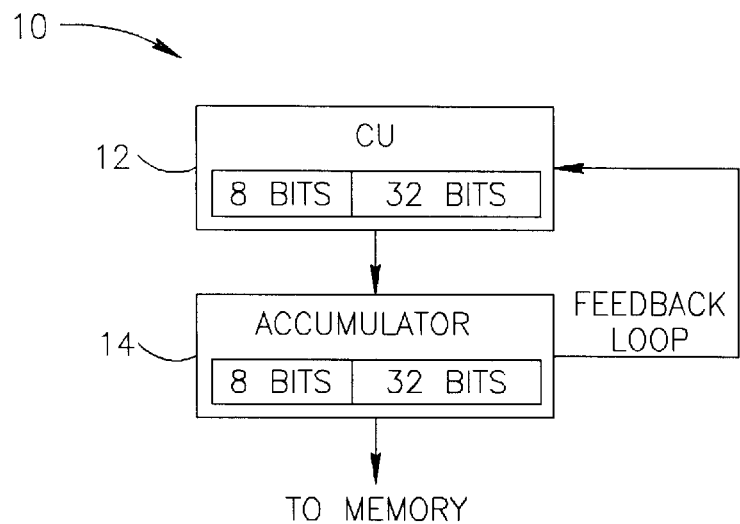
FIGS. 1A and 1B are schematic illustrations of a prior art digital signal processor (DSP)
Figure 1B:
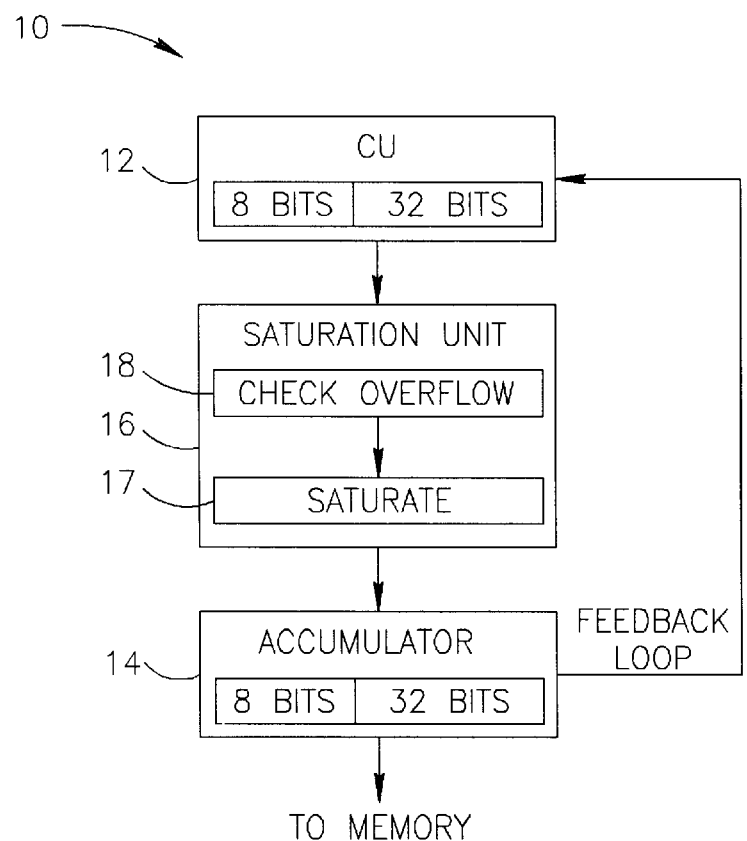
Figure 2:
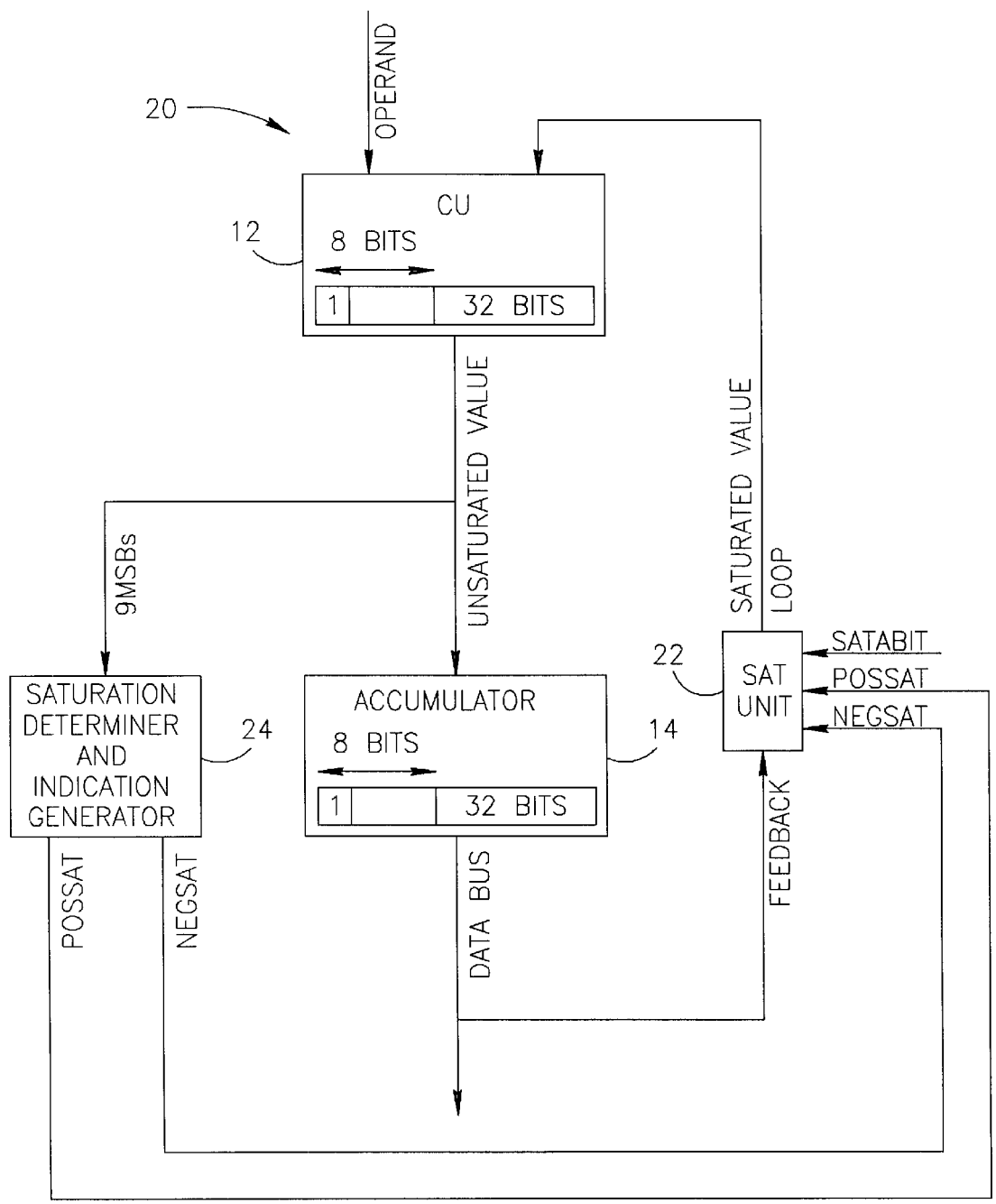
FIG. 2 is a schematic illustration of a DSP with a feedback saturation mechanism.

Reference is now made to FIG. 2 which is an illustration of a DSP 20 having a feedback saturation mechanism in accordance with a preferred embodiment of the present invention. Similar items to those mentioned in previous figures have similar reference numerals and will not be described further.

DSP 20 comprises a CU 12 connected to an accumulator 14. DSP 20 further comprises a saturation (SAT) unit 22 in the feedback loop from the accumulator 14 to the CU 12 and a saturation determination and indication generator 24 (SDET). SDET 24 determines a saturation condition in parallel to the latching of the accumulator whilst SAT unit 22 saturates the value coming from the accumulator 14 in the feedback path to the computation unit (CU) 12 if an overflow condition is established. The delay associated with the determination of the saturation condition is therefore eliminated. Computation unit (CU) 12 is, by way of example, of 40 bit accuracy and accumulator 14 is of 40 bit accuracy but the computations are limited to a 32 bit accuracy when an overflow condition is established.

SAT unit 22 is controlled by saturation determination and indication generator 24 (SDET) which determines whether the value being written to the accumulator 14 is overflowed and whether the overflow is positive or negative. That is, whether the value is too big in a positive sense or in a negative sense for the desired accuracy of A bits. SDET 24 generates a positive or negative saturation indication in parallel to latching accumulator 14 according to whether positive or negative overflow has occurred. This indication is input to SAT unit 22, allowing SAT unit 22 to generate the correct saturated value in the feedback loop to CU 12. This is described further hereinbelow. Furthermore, a saturate accumulator mode bit (SATA) is set by DSP 20 or in an alternative way by the user to enable or disable the operation of the saturation unit The dynamic range is achieved, as described hereinabove, by having one bit (the Most Significant Bit or MSB) dedicated to the sign in both CU 12 and in accumulator 14 and eight guard bits, as is shown. The bit dedicated to the sign is a 1 for a negative sign and a 0 for a positive sign. The eight guard bits of accumulator 14 which prevent the loss of sign when overflow occurs are also shown.

Figure 3A:
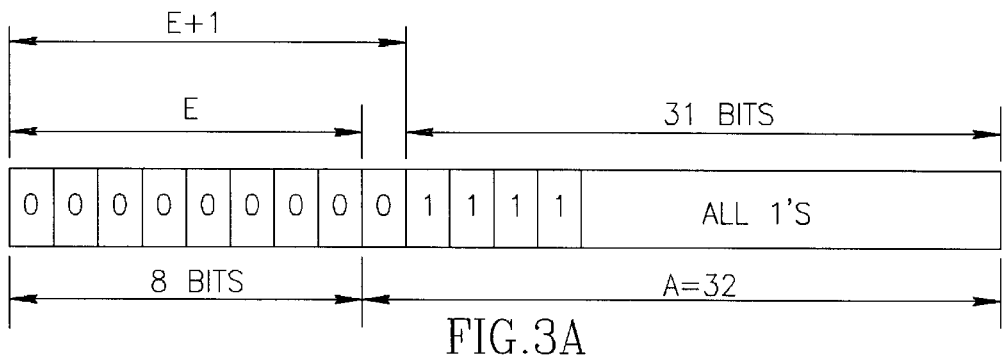
FIGS. 3A and 3B are illustrations of the constitution of the stored values in the DSP for positive overflow and the mechanism for detecting overflow.
Figure 3B:
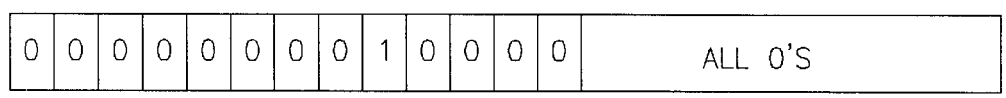
Figure 4A:
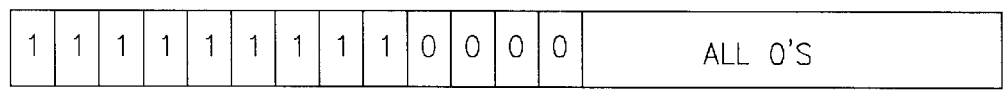
FIGS. 4A and 4B are illustrations of the constitution of the stored values in the DSP for negative overflow and the mechanism for detecting such overflow.
Figure 4B:
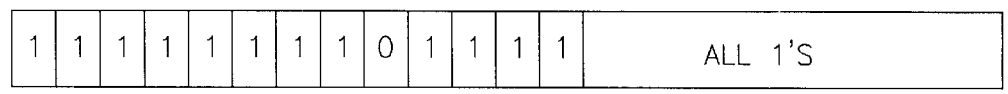

Reference is now made to FIGS. 3A–3B and to FIGS. 4A–4B which illustrate the constitution of the stored values in the exemplary DSP 20 for positive and negative overflow respectively and the mechanism of detecting overflow. The values are represented in two's complement. Similar items to those in previous figures have similar reference numerals and will not be described further.

FIG. 3A illustrates the two's complement value which occurs just before positive overflow for an exemplary accuracy, A, of 32 bits with 8 guard bits. The accumulator width, W, is 40 bits and the relationship E=W−A holds as described hereinabove. The value represented in FIG. 3A is the value 007fffffff in hexadecimal format ("hex"), namely E+1 zero bits followed by A−1 one bits and is the maximum value which can be represented in the exemplary accuracy of 32 bits, before overflow occurs. The MSB is zero, denoting a positive number (and hence positive saturation). When the overflow condition is detected, this maximum saturation value replaces the overflow value in the feedback loop as mentioned hereinabove.

Contrasting the position just before overflow, FIG. 3B illustrates the next number, that is, the first number which is "overflowed". It can be seen that the MSB is still zero denoting a positive number, but a 1 becomes a part of the E+1 MSBs. Thus, the E+1 MSBs are not all the same. This is the overflow detection condition. Thus, the overflow condition for positive saturation is when the first E+1 MSBs are not the same and the MSB is zero. When the value increases to a point where the MSB becomes 1, the sign is lost and in this case saturation may not be detected.

Reference is now made to FIG. 4A which illustrates the maximum two's complement value which occurs just before negative overflow for the exemplary accuracy, A of 32 bits and width, W of accumulator 14 of 40 bits, as described hereinabove. This value may be represented as ff80000000 in "hex", namely E+1 1 bits followed by A−1 zero bits. ff80000000 is the maximum negative value which can be represented in the exemplary accuracy of 32 bits, before overflow occurs. The MSB is 1, denoting a negative number (and hence negative saturation). When the overflow condition is detected, this maximum negative saturation value replaces the overflow value in the feedback loop as described similarly hereinabove in relation to positive saturation.

Contrasting the position just before overflow, FIG. 4B illustrates the next number which is the first negative number that is "overflowed". It can be seen that the MSB remains 1, denoting a negative number but a 0 becomes a part of the E+1 MSBs. Thus, the E+1 MSBs are not all the same. This is the overflow detection condition. Thus, the overflow condition for negative saturation is when the first E+1 MSBs are not the same and the MSB is 1. When the value decreases to a point where the MSB becomes 0, the sign is lost and in this case a saturation condition may not be detected.

Thus, the detection of an overflowed accumulator (and the generation of the saturation indications) is done by looking at its E+1 (9 in this example) most significant bits. If they are all equal it is unsaturated, if they are different and the MSB is 0, it is a positive overflow (condition where positive overflow has occurred) and if they are different and the MSB is 1, it is a negative overflow (condition where negative overflow has occurred). SAT unit 22 replaces the data coming from accumulator 14 with a saturated value 007fffffff (in hex) (E+1 zero bits, followed by A−1 one bits) in the case for positive overflow and ff80000000 (in hex) (E+1 one bits, followed by A−1 zero bits) in the case for negative overflow.

It will be appreciated that accumulator 14 always receives a value which has not been saturated. When the SATA mode is enabled, as described above, saturation unit 22 determines whether or riot to replace the output of the accumulator 14 in the feedback loop with a saturated value which is then provided to CU 12 as described above. Thus, in this mode, the output of saturation unit 22 is used by CU 12. Hence, CU 12 will receive a saturated value whenever the output of accumulator 14 is larger than allowed accuracy, A, without affecting the value stored in accumulator 14. Processor 20 is thus converted to a 32-bit processor in the present example as the dynamic range of the computation is limited to 32 bits, without degrading the processor performance (speed).

Figure 5A:
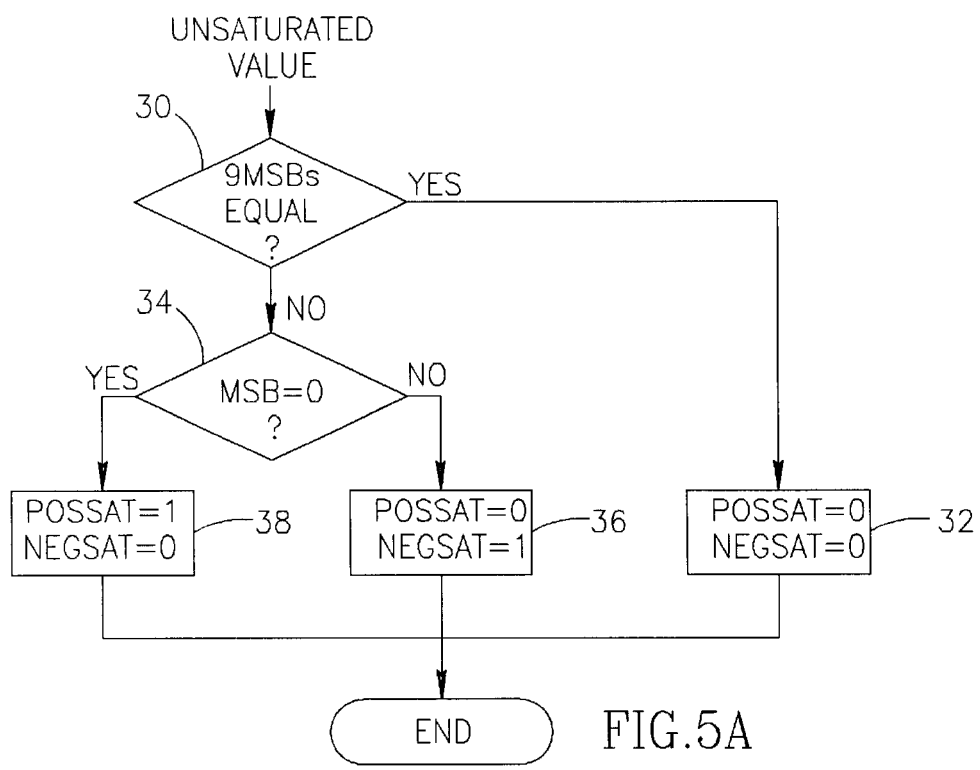
FIGS. 5A and 5B are flow chart illustrations of the steps for detection of the saturation conditions and the substitution of the saturation values respectively.
Figure 5B:
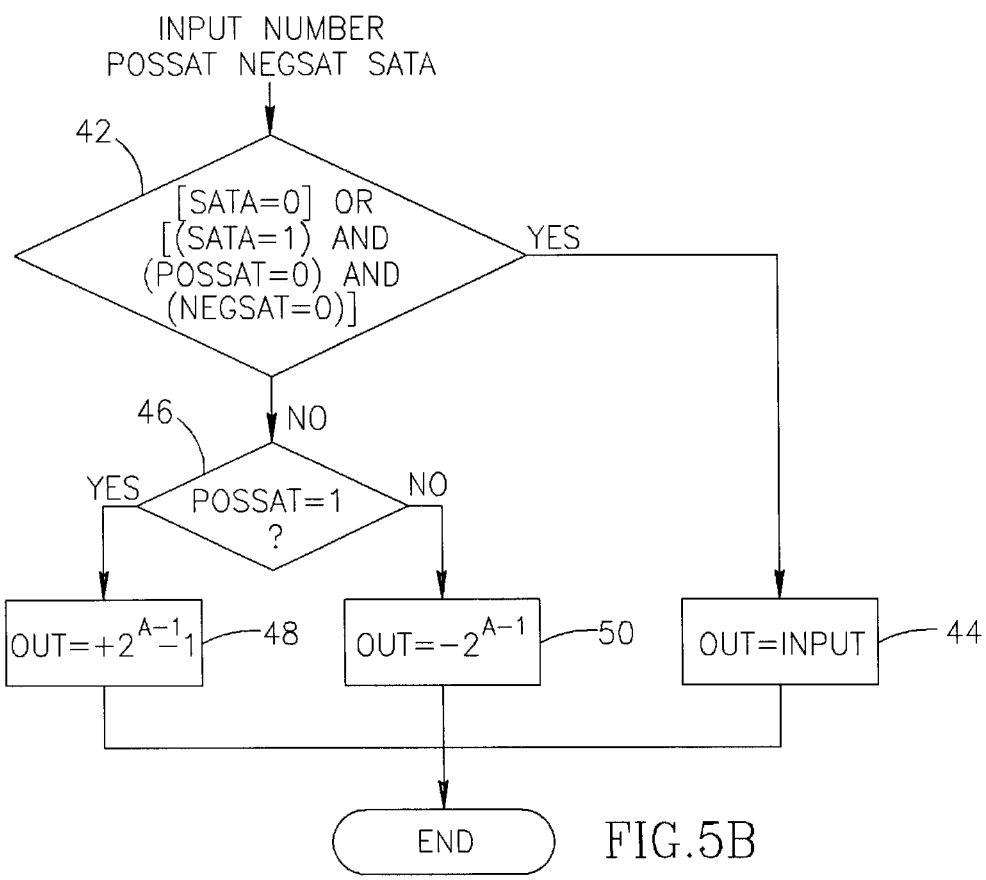

Reference is now made to FIGS. 5A and 5B. FIG. 5A is a flow chart illustration of the calculation of a positive saturation indication "possat" or a negative saturation indication "negsat" by saturation determiner and indication generator 24. FIG. 5B is a flow chart illustration of the mode of utilization of the "possat" and "negsat" indications by saturation unit 22 to set the level of the saturation value.

Turning to FIG. 5A, saturation determiner and indication generator 24 checks (step 30) whether the nine MSBs are equal. If they are equal then there is no saturation condition and "possat" and "negsat" are set (step 32) to zero.

If they are not equal then saturation determiner 24 ascertains (step 34) whether the MSB is zero. If the MSB is not zero (i.e it is of value1), then a negative saturation condition has occurred and "possat" is set to zero and "negsat" is set to 1 (step 36). If the MSB is 0 (as checked in step 34), a positive saturation condition exists and "possat" is set to 1 and "negsat" is set to zero (step 38).

Turning to FIG. 5B, the operation of SAT unit 22 will be described. SAT unit 22 receives the value stored in accumulator 14 and the "possat" and "negsat" indications from indication generator 24. If SAT unit 22 receives a zero SATA bit, it is not activated, no saturation occurs and the output of SAT unit 22 is equal to the input (step 44). Also, when SAT unit 22 receives a SATA bit of 1 and is therefore activated but "possat" and "negsat" are zero, indicating no overflow, no saturation occurs and the output of SAT unit 22 is equal to the input (step 44). However, if the above two conditions do not exist, namely when SAT unit 22 is activated (SATA= 1) and either of "possat" and "negsat" are 1, then saturation will occur if "possat" is 1 (step 46) indicating a positive saturation, and SAT unit 22 outputs a value of $2^{A-1}1$ (where A is the required accuracy) (step 48) In the present example, where A=32, this value is 007fffff in hex as described above. If "negsat" is 1 (step 46), indicating a negative saturation, SAT unit 22 outputs a value of $-2^{A-1}$ (step 50) which is the maximum negative value allowed for an accuracy of A bits. Where A=32, this value is ff80000000 in hex as described hereinabove.

It will be appreciated, by persons skilled in the art, that the present invention is not limited by what has been particularly shown and described hereinabove. Rather the scope of the invention is defined by the claims that follow.

What is claimed is:

1. A processor comprising:
   a computation unit for operating on at least one operand of W bits;
   an accumulator unit for storing the output of said computation unit in W bits;
   a saturation determination unit for detecting overflow in parallel with latching of said output in said accumulator wherein overflow occurs when the operand latched by said accumulator represents a number having more than A significant bits, wherein A is less than W; and
   a saturation unit for providing saturation operands to said computation unit when the operand latched in said accumulator unit represents a number having more than A significant bits.

2. A processor according to claim 1 wherein the saturation operands are either ($+2^{A-1}-1$) or $-2^{A-1}$.

3. A method for providing saturated operands to a computation unit, the method comprising the steps of:
   latching of an operand of W bits received from said computation unit by an accumulator unit;
   detecting in parallel with said step of latching a condition wherein when the operand latched in said accumulator unit represents a number having more than A significant bits, wherein A is less than W; and
   providing said computation unit with a saturated operand if said condition is met wherein said saturated operand comprises the maximum positive or negative value which can be represented in A bits.

4. A method according to claim 3 wherein said step of providing includes providing said saturated operand as a value of either ($+2^{A-1}-1$) or $-2^{A-1}$.

5. A processor comprising:
   a saturation determination unit to detect an overflow condition of output of a computation unit in parallel to latching of said output in an accumulator; and
   a saturation unit to provide saturated operands in a feedback loop from said accumulator to said computation unit when said overflow condition is met.

6. The processor of claim 5, wherein said saturated operands are either the maximum positive or negative value which can be represented in a predetermined number of bits.

7. The processor of claim 5, wherein said saturation unit is controlled by said saturation determination unit.

8. The processor of claim 5, wherein said saturation determination unit generates a positive or negative saturation indicator and provides it to said saturation unit.

9. The processor of claim 5, wherein an indicator to enable said saturation unit is provided to said saturation unit.

10. A method for providing saturated operands, the method comprising:
    detecting an overflow condition in parallel to latching of an operand received from a computation unit by an accumulator; and
    providing a saturated operand to said computation unit if said overflow condition is met.

11. The method of claim 10, wherein detecting said overflow condition comprises detecting said overflow condition for positive saturation and wherein providing said saturated operand comprises providing a maximum positive value which can be represented in a predetermined number of bits.

12. The method of claim 10, wherein detecting said overflow condition comprises detecting said overflow condition for negative saturation and wherein providing said saturated operand comprises providing a maximum negative value which can be represented in a predetermined number of bits.

* * * * *